UNITED STATES PATENT OFFICE.

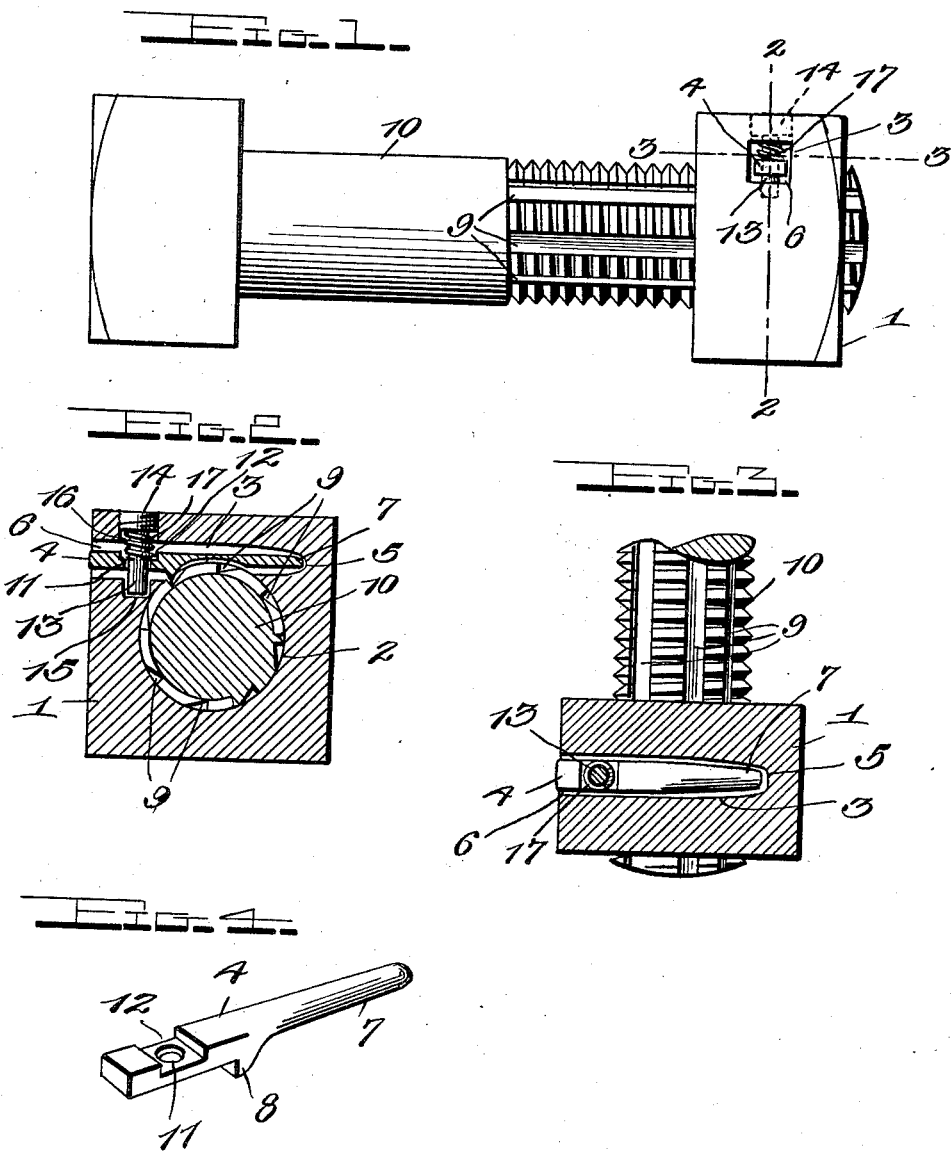

GEORGE O. DOUTHIT, OF SUMMERS, ARKANSAS, ASSIGNOR TO M. M. McCOY, OF WESTVILLE, OKLAHOMA.

LOCK-NUT.

1,030,464.  Specification of Letters Patent.  Patented June 25, 1912.

Application filed March 2, 1912. Serial No. 681,066.

*To all whom it may concern:*

Be it known that I, GEORGE O. DOUTHIT, a citizen of the United States, residing at Summers, in the county of Washington and State of Arkansas, have invented certain new and useful Improvements in Lock-Nuts, of which the following is a specification, reference being had to the accompanying drawings.

This invention comprehends certain new and useful improvements in lock nuts, and the invention has for its primary object a simple, durable and efficient construction of device of this character which may be very cheaply manufactured and the parts readily assembled, which will not be liable to get out of order or accidentally release its hold on the bolt, and which may be removed from the bolt whenever desired. And the invention also aims to generally improve devices of this class and to render them more useful and commercially desirable.

With these and other objects in view, as will more fully appear as the description proceeds, the invention consists in certain constructions, arrangements and combinations of the parts that I shall hereinafter fully describe and claim.

For a full understanding of the invention, reference is to be had to the following description and accompanying drawing in which, Figure 1 is a side elevation of a bolt and lock nut constructed in accordance with my invention. Fig. 2 is a transverse sectional view on the line 2—2, of Fig. 1. Fig. 3 is a section taken on the line 3—3, of Fig. 1, and, Fig. 4 is a detail perspective view of the locking pawl or detent.

Corresponding and like parts are referred to in the following description and designated in the accompanying drawing by like reference characters.

Referring to the drawing, the numeral 1 designates my improved lock nut which may be of any desired exterior conformation, for instance, either rectangular, or hexagonal, as desired, and which is formed with the usual threaded bolt receiving opening 2. Leading into the opening 2 intermediate of the side faces of the nut 1, a recess 3 is formed therein, said recess being designed to house a pawl or detent 4. The inner end of the recess 3 terminates in a somewhat rounded socket 5, while the outer end of the recess terminates in a substantially rectangular chamber 6 which opens into one edge of the nut. The pawl or detent 4 is provided with an inner round end 7 mounted in the socket 5 and is formed intermediate of its ends with an inwardly facing tooth 8 adapted to project into the bolt receiving opening 2 through the recess 3 so as to engage with any one of a plurality of longitudinally extending grooves 9 formed in the bolt 10. The relatively free or outer end of the detent 4 is flattened, as shown, and is formed with an aperture 11 extending therethrough and with a substantially rectangular recess 12 on one side of and surrounding said aperture. A stem 13 which is formed integrally with a threaded plug 14, projects into and through the aperture 11, the inner end of said stem being adapted to be seated in a socket 15 formed at the bottom of a threaded opening 16 in which the plug 14 is adapted to screw. The chamber 6 and opening 16 are formed in adjoining sides of the nut 1, preferably close to one corner edge.

17 designates a spring which encircles the stem 13 and which is adapted to bear against one end of the detent 4 and re-act against the inner end of the plug 14, whereby the spring will have a tendency to move the detent inwardly so that its tooth 8 will project into the bolt receiving opening 2 into engagement with the grooves of the bolt 10. The relatively free extremity of the pawl or detent 4 is entirely housed within the chamber 6, whereby the pawl or detent will not be injured in any way by the application of a wrench or other tool to the nut, while at the same time, the detent may be easily released whenever desired by inserting one's finger or a small tool into the chamber and prying the detent back. Thus, the nut may be easily screwed up on the bolt, but will be effectively prevented from any accidental unscrewing movement, although the nut may be easily unscrewed when desired by holding the pawl or detent in retracted position within the nut.

From the foregoing description in connection with the accompanying drawing, the operation of my improved lock nut will be apparent. In the practical use of the device, the operation of screwing the nut on the bolt will automatically lock it thereon in adjusted position, as the tooth 8 will snap over the threads of the bolt and rest in the adjusted position of the nut in one of the longitudinally extending grooves 9.

While the accompanying drawing illustrates what I believe to be the preferred embodiment of my invention, it is to be understood that the invention is not limited thereto, but that various changes may be made in the construction, arrangement and proportions of the parts without departing from the scope of the invention, as defined in the appended claims.

Having thus described my invention, what I claim is:—

1. A lock nut formed with a bolt receiving opening and a recess opening into said bolt receiving opening intermediate of the opposite faces of the nut, the nut being further formed at the inner end of said recess with a socket and at the outer end of said recess with a chamber opening into one side of the nut, a locking pawl adapted to be slipped in through said chamber into the recess and socket and having its inner end fitted in the socket and formed intermediate of its ends with a tooth adapted to project through the recess into the bolt receiving opening of the nut, the outer end of the detent being housed within said chamber and being formed with an aperture extending therethrough, the nut being further formed with an opening extending at right angles to the chamber and intersecting the same, the inner end of said opening forming a socket, a plug screwing into said opening and provided with a stem passing through the aperture of the detent into the socket, and a spring encircling said stem and adapted to bear against the plug and the detent, for the purpose specified.

2. The herein described lock nut provided with a bolt receiving opening with a recess extending into said opening and with a chamber at one end of said recess, a detent mounted in said recess and provided with a tooth adapted to project therethrough into the bolt receiving opening of the nut and formed with a handle end mounted in said chamber, the nut being further formed with an opening intersecting said chamber, a plug mounted in said opening, and a spring interposed between said plug and the detent, for the purpose specified.

In testimony whereof I hereunto affix my signature in the presence of two witnesses.

GEORGE O. DOUTHIT.

Witnesses:
W. F. PARKER,
M. L. SHEFFIELD.

Copies of this patent may be obtained for five cents each, by addressing the "Commissioner of Patents, Washington, D. C."